2,972,539

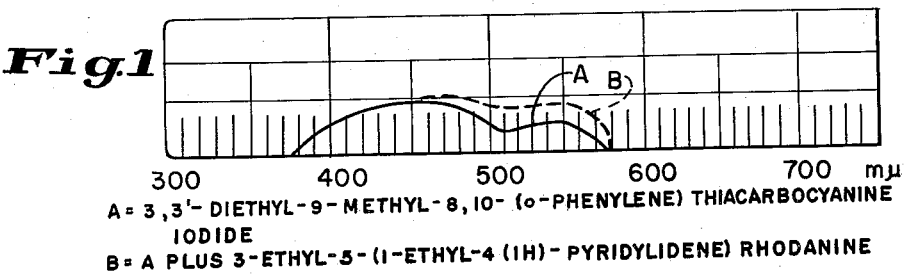
A = 3,3'- DIETHYL-9-METHYL-8,10- (o-PHENYLENE) THIACARBOCYANINE IODIDE
B = A PLUS 3-ETHYL-5-(1-ETHYL-4(1H)- PYRIDYLIDENE) RHODANINE
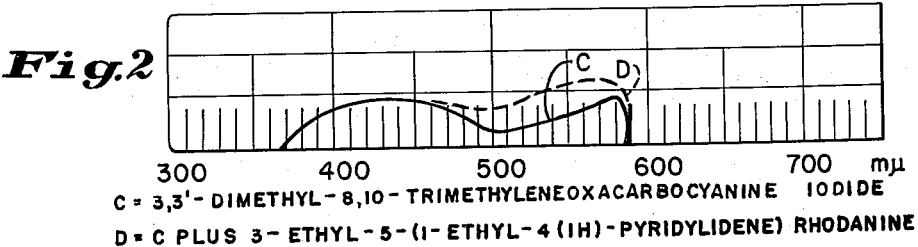
C = 3,3'- DIMETHYL-8,10- TRIMETHYLENEOXACARBOCYANINE IODIDE
D = C PLUS 3- ETHYL-5-(1- ETHYL-4(1H)-PYRIDYLIDENE) RHODANINE
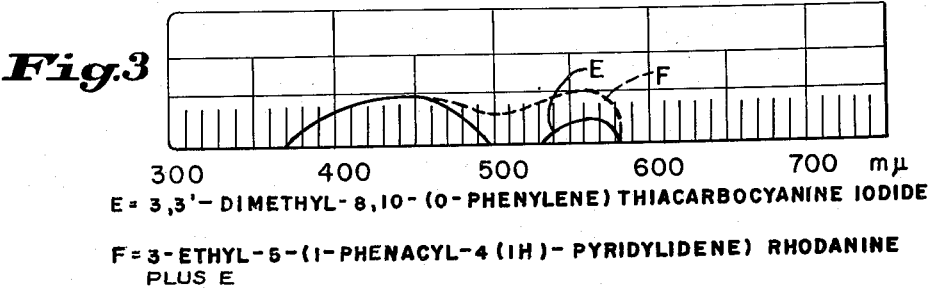
E = 3,3'- DIMETHYL-8,10- (O-PHENYLENE) THIACARBOCYANINE IODIDE
F = 3-ETHYL-5-(1-PHENACYL-4(1H)- PYRIDYLIDENE) RHODANINE PLUS E
Jean E. Jones
INVENTOR.

SUPERSENSITIZATION OF CARBOCYANINE DYES BY SIMPLE MEROCYANINE DYES

Jean E. Jones, Rochester, N.Y., assignor to Eastman Kodak Company, Rochester, N.Y., a corporation of New Jersey Filed Dec. 24, 1959, Ser. No. 861,821

14 Claims. (Cl. 96—104)

This invention relates to photographic silver halide emulsions containing certain carbocyanine dyes and in supersensitizing combination therewith, certain simple merocyanine dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a means of altering the sensitivity in emulsions containing certain carbocyanine dyes. Since the conditions in the emulsion, i.e., the hydrogen ion and/or the silver ion concentration undergo little or no change in my method, I shall designate my new method as a kind of supersensitization.

It is, therefore, an object of my invention to provide photographic silver halide emulsions containing certain carbocyanine dyes and in supersensitizing combination therewith, certain simple merocyanine dyes. Another object is to provide a means for preparing such supersensitized emulsions. Other objects will become apparent from a consideration of the following description and examples.

It has been previously suggested in the prior art that certain carbocyanine dyes can be employed in supersensitizing combinations with various merocyanine dyes of the open-chain type. See Collins et al. U.S. Patent 2,411,507, issued November 26, 1946. This patent also suggests employing certain simple merocyanine dyes containing a ketomethylene ring in combination with various carbocyanine dyes, although it has been found that the supersensitizing effects obtained with such combinations are quite small quantitatively or not measurable in some instances.

It has now been found that simple merocyanine dyes containing certain acidic nuclei and a pyridine nucleus can be used effectively to increase the speed of photographic silver halide emulsions sensitized with certain carbocyanine dyes having a bridge of carbon atoms across the trimethine linkage. It has been found that the advantages of my invention are particularly outstanding in the case of simple merocyanine dyes wherein the acidic nucleus has five atoms in the heterocyclic ring and that the advantages are considerably less outstanding in the case of simple merocyanine dyes wherein the acidic nucleus contains six atoms in the ring, such as simple merocyanine dyes containing a 2-thiobarbituric acid nucleus. In some instances these latter dyes are difficult to dissolve, and this lack of solubility might account for their poor showing as supersensitizers according to my invention. It was unexpected to find that the simple merocyanine dyes as hereinafter defined could be used to increase effectively the sensitivity of photographic silver halide emulsions sensitized with certain carbocyanine dyes containing a bridge of carbon atoms across the trimethine chain, inasmuch as these latter dyes are "crowded" and in general have rather poor sensitizing action.

The simple merocyanine dyes useful in practicing my invention include these dyes represented by the following general formula:

I.

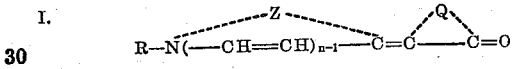

$$R-N(-CH=CH)_{n-1}-C=C-C=O$$

wherein R represents a hydrogen atom or an alcohol radical, i.e., an unsubstituted or substituted alkyl group, such as methyl, ethyl, isopropyl, butyl, isobutyl, β-hydroxyethyl, γ-hydroxypropyl, carboxymethyl, ethoxycarbonylmethyl, benzyl (phenylmethyl), phenacyl (benzoylmethyl), β-phenoxyethyl, β-sulfoethyl, 4-sulfobutyl, etc. (e.g., an alkyl group containing from 1 to 4 carbon atoms), n represents a positive integer of from 1 to 2, Z represents the non-metallic atoms necessary to complete a pyridine nucleus, i.e., a 2-pyridine nucleus (e.g., pyridine, 5-methylpyridine, etc.) or a 4-pyridine nucleus (e.g., pyridine, etc.), and Q represents the non-metallic atoms necessary to complete a heterocyclic nucleus containing five atoms in the heterocyclic ring, such as a pyrazolinone nucleus (e.g., 3-methyl-1-phenyl-5-pyrazolinone, 1 - phenyl-5-pyrazolinone, 1-phenyl-5-pyrazolinone, 1 - (2 - benzothiazolyl)-3-methyl-5-pyrazolinone, etc.), an isoxazolinone nucleus (e.g., 3 - phenyl - 5(4H)-isoxazolinone, 3-methyl-5(4H)-isoxazolinone, etc.), an oxindole nucleus (e.g., 1-alkyl-2,3-dihydro-2-oxindoles, etc.), a rhodanine nucleus (i.e., 2-thio-2,4-thiazolidinedione series), such as rhodanine, 3-alkylrhodanines (e.g., 3-ethylrhodanine, 3-ethoxycarbonylmethylrhodanine, 3-allylrhodanine, etc.) or 3 - arylrhodanines (e.g., 3-phenylrhodanine, etc.), etc., a 2-selena-2,4 - thiazoidinedione nucleus (e.g., 3 - ethyl-2-selena-2,4-thiazolidinedione, etc.), a 2-thio-2,4-oxazolidinedione nucleus (i.e., those of the 2-thio-2,4(3H,5H)-oxazoledione series) (e.g., 3-ethyl-2-thio-2,4-oxazolidinedione, etc.), a 2-thio-2,5-thiazolidinedione nucleus (i.e., the 2-thio-2,5 (3H,4H)-thiazoledione series) (e.g., 3 - ethyl - 2 - thio-2,5-thiazolidinedione, etc.), a 2,4 - thiazolidinedione nucleus (e.g., 2,4-thiazolidinedione, 3 - ethyl - 2,4 - thiazolidinedione, 3 - phenyl - 2,4 - thiazolidinedione, 3-α-naphthyl-2,4 - thiazolidinedione, etc.), a thiazolidione nucleus (e.g., 4 - thiazolidione, 3 - ethyl - 4 - thiazolidione, 2 - dicyanomethylene - 3 - ethyl - 4 - thiazolidinone, 3-phenyl - 4 - thiazolidione, 3 - α - naphthyl - 4 - thiazolidinone, etc.), a 4 - thiazolinone nucleus (e.g., 2 - ethylmercapto - 4 - thiazolinone, 2 - alkylphenylamino - 4 - thiazolinone, 2 - diphenylamino - 4 - thiazolinone, etc.), a 2(3H) - thiophenone nucleus (e.g., 5-methyl - 2(3H)-thiophenone, etc.), a 2 - imino - 2,4-oxazolinone (i.e., pseudohydantoin) nucleus, a 2,4-imidazolinedione (hydantoin) nucleus (e.g., 2,4 - imidazolinedione, 3 - ethyl-2,4-imidazolinedione, 3 - phenyl - 2,4-imidazolinedione, 3-α-naphthyl-2,4-imidazolinedione, 1,3 - diethyl - 2,4 - imidazolinedione, 1 - ethyl - 3 - α - naphthyl - 2,4-imidazolinedione, 1,3 - diphenyl - 2,4 - imidazolinedione, etc.), a 2-thio - 2,4 - imidazolinedione (i.e., 2 - thiohydantoin) nucleus (e.g., 2 - thio - 2,4 - imidazolinedione, 3-ethyl-2-thio-2,4 - imidazolinedione, 3 - phenyl - 2-thio-2,4-imidazolinedione, 3 - α - naphthyl - 2 - thio-2,4-imidazolinedione, 1,3-diethyl - 2 - thio 2,4-imidazolinedione, 1-ethyl-3-phenyl-2-thio - 2,4 - imidazolinedione, 1 - ethyl-3-α-naphthyl-2-thio-2,4 - imidazolinedione, 1,3 diphenyl - 2 - thio-2,4-imidazolinedione, etc.), a 5 - imidazolinone nucleus (e.g., 2-n-propylmercapto - 5 - imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

Simple merocyanine dyes including those represented by Formula I above have been previously described in the prior art. For instance, such dyes can be prepared according to the method described in Brooker U.S. Patent 2,185,182, issued January 2, 1940. Brooker U.S. Patent 2,743,274, issued April 24, 1956, also describes the preparation of several simple merocyanine dyes which can be used in my invention. The preparation of other simple merocyanine dyes which can be employed in my invention is described in my copending application Serial No. 801,130, filed March 23, 1959.

The carbocyanine dyes useful in practicing my invention can advantageously be represented by the following general formula:

II.

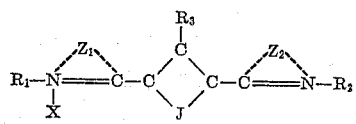

wherein $R_1$ and $R_2$ each represents an alcohol radical, i.e., an unsubstituted or substituted alkyl group, such as methyl, ethyl, isopropyl, butyl, isobutyl, β-hydroxyethyl, β-sulfoethyl, 4-sulfobutyl, β-carboxyethyl, etc., $R_3$ represents a hydrogen atom, a lower alkyl group, such as methyl, ethyl, propyl, butyl, etc., or a monocyclic aryl group, such as phenyl, tolyl, etc. (e.g., a monocyclic aryl group of the benzene series containing from 6 to 7 carbon atoms), J represents an alkylene group containing from 2 to 3 carbon atoms (e.g., ethylene, propylene, etc.), or an o-phenylene group (which may or may not be further substituted by methyl, ethyl, chlorine, etc.), provided that $R_3$ represents a hydrogen atom when J represents an alkylene group, X represents an acid radical, such as chloride, bromide, iodide, benzenesulfonate, p-toluenesulfonate, methylsulfate, ethylsulfate, perchlorate, thiocyanate, etc., and $Z_1$ and $Z_2$ each represents the nonmetallic atoms necessary to complete a heterocyclic nucleus, such as those selected from the group consisting of a thiazole nucleus (e.g., thiazole, 4-methyl, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7 - chlorobenzothiazole, 4 - methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5 - methoxybenzothiazole, 6 - methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2]-thiazole, naphtho[2,1]-thiazole, 5-methoxynaphtho[2,1]thiazole, 5 - ethoxynaphtho[2,1]-thiazole, 8 - methoxynaphtho[1,2]thiazole, 7 - methoxynaphtho[1,2]thiazole, etc.), a thiadiazole nucleus (e.g., 3-methyl - 5 - α - naphthyl-1,3,4-thiadiazole, 3-ethyl-5-α-naphthyl-1,3,4-thiadiazole, etc.), a thianaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5 - chlorobenzoxazole, 5 - methylbenzoxazole, 5-phenylbenzoxazole, 6-methylbenzoxazole, 5,6 - dimethylbenzoxazole, 4,6 - dimethylbenzoxazole, 5 - methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho [1,2]oxazole, naphtho[2,1]oxazole, etc.), a selenazole nucleus (e.g., 4-methylselenazole, 4-phenylselenazole, etc.), a benzoselenazole nucleus (e.g., benzoselenazole, 5 - chlorobenzoselenazole, 5 - methoxybenzoselenazole, 5-hydroxybenzoselenazole, tetrahydrobenzoselenazole, etc.), a naphthoselenazole nucleus (e.g., naphtho[1,2]selenazole, naphtho[2,1]selenazole, etc.), a thiazoline nucleus (e.g., thiazoline, 4-methylthiazoline, etc.), or a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6 - hydroxyquinoline, 8-hydroxyquinoline, etc.), etc.

It will be noted that Formula II above excludes 4,4'-carbocyanine dyes. In some instances, when the dyes of Formula II have an acid-substituted alkyl group attached to a nitrogen atom, these dyes may spontaneously lose the elements of HX so that the dyes can then be regarded as anhydronium bases. This fact is well known to those skilled in the art. It is, therefore, apparent that the dyes of Formula II might more accurately be regarded as existing in either one of the following ionized forms:

IIa.

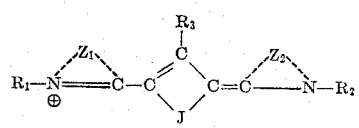

↕

IIb.

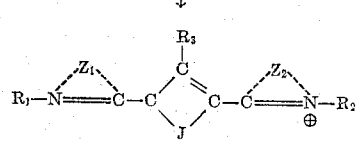

since these carbocyanine dyes are actually adsorbed to the silver halide grains in such forms.

The carbocyanine dyes embraced by Formulas II, IIa and IIb above include many well known dyes. Such dyes can advantageously be prepared according to methods described in a number of issued patents, such as Kendall U.S. Patent 2,265,909, issued December 9, 1941, and I.G.F. British Patent 483,045, accepted April 7, 1938.

According to my invention, I incorporate one or more of the simple merocyanine dyes represented by Formula I above with one or more of the carbocyanine dyes represented by Formulas II, IIa and IIb above. My invention is particularly directed to the ordinarily employed gelatino-silver-halide developing-out emulsions. However, my supersensitizing combinations can be employed in silver halide emulsions in which the carrier or vehicle is other than gelatin, e.g., a resinous material, such as polyvinyl alcohol, albumen, etc., or a hydrophilic cellulosic material, which has no deleterious effect upon the light-sensitive halide. The simple merocyanine and carbocyanine dyes useful in my invention can be employed in various concentrations, depending upon the particular emulsion, concentration of silver halide, particular results desired, etc. The simple merocyanine dyes useful in my invention generally have very little or no detectable sensitizing action on their own (i.e., when employed in the absence of other sensitizing materials).

Ordinarily, the optimum, or near optimum, concentration of the simple merocyanine dyes which I employ in practicing my invention is of the order of 0.01 to 0.30 g. per mol. of silver halide in the emulsion.

The carbocyanine dyes useful in practicing my invention can advantageously be used at somewhat higher concentrations than the simple merocyanine dyes, for example, at concentrations varying from about 0.03 to 1.0 g. per mol. of silver halide in the emulsion.

In general, the ratio of concentration of simple merocyanine dye to carbocyanine dye can vary rather widely in my combinations, e.g., from 1:1 to 1:100 (by weight) in many cases.

The method of incorporating sensitizing dyes in silver halide emulsions is well known to those skilled in the art and these known techniques are employed in dispersing the simple merocyanine and carbocyanine dyes of my invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the simple merocyanine and carbocyanine dyes can be separately dissolved in a given solvent and added separately to the emulsion, or they can be dissolved in the same or different solvent and these solutions mixed together before addition is made to the silver halide emulsions. The simple merocyanine and carbocyanine dyes can be dispersed in the finished emulsions and should be uniformly distributed throughout the emulsions before the emulsions are coated on a suitable support, such as paper, glass, cellulose ester film, polyvinyl resin film (e. g., polystyrene film, polyvinyl chloride film, etc.), polyester film, etc. The following procedure has been found quite satisfactory: Stock solutions of the simple merocyanine dyes and carbocyanine dyes are prepared by separately dissolving these dyes in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in hte art. The foregoing procedure and proportions are to be regarded only as illustrative. Clearly, my invention is directed to any silver halide emulsion containing a combination of the aforesaid simple merocyanine dyes and carbocyanine dyes whereby a supersensitizing effect is obtained.

The following examples will serve to illustrate more fully the manner of practicing my invention.

To different portions of the same batch of photographic gelatino-silver-bromiodide emulsion were added (1) a simple merocyanine dye, (2) a carbocyanine dye of Formula II and (3) a combination of a simple merocyanine dye and the carbocyanine dye. The emulsions were held for a short time at about 50–52° C., coated on a transparent support, chill-set and dried. The coatings were then separately exposed to daylight quality radiation through a Wratten No. 12 Filter, a Wratten No. 58 Filter, or a Wratten No. 25 Filter. The exposures were made through a step tablet on an Eastman Type Ib Sensitometer. A Wratten No. 12 Filter transmits substantially no light of wavelength shorter than about 495 m$\mu$ (except for about 1% between 300 and 340 m$\mu$), a Wratten No. 58 Filter transmits only light of wavelengths lying between 465 and 620 m$\mu$, while a Wratten No. 25 Filter transmits substantially no light of wavelength shorter than about 580 m$\mu$. The filter was selected to correspond to the maximum sensitizing region of the particular carbocyanine dye illustrated. The exposed coatings were then exposed for 3 minutes in a developer having the following compositions:

| | G. |
|---|---|
| N-methyl-p-aminophenol sulfate | 2.0 |
| Hydroquinone | 8.0 |
| Sodium sulfite (dessiccated) | 90.0 |
| Sodium carbonate (monohydrate) | 52.5 |
| Potassium bromide | 5.0 |
| Water to make one liter. | |

The speed, gamma and fog for each of the coatings were then measured where it was possible to do so. The same emulsion batch was used for the coatings of each example, although not all of the examples used the same emulsion batch. The coatings of Examples 2 to 8 were made from the same batch of emulsion, the coatings of Examples 9 and 10 were made from the same batch of emulsion, the coatings of Examples 11 to 13 were made from the same batch of emulsion, the coatings of Examples 14 to 22 were made from the same batch of emulsion, the coatings of Examples 23 and 24 were made from the same batch of emulsion, and the coatings of Examples 25 to 30 were made from the same batch of emulsion. The results obtained are given in the following table where the speed figures are given in terms of relative speed. Dyes are given the same identification number throughout the table. Thus, the dye used in Example 1(a) retains that identity even when employed in other examples, such as Example 2(d).

| Example | Dye (g./mol. AgX) | Speed | Gamma | Fog | Filter |
|---|---|---|---|---|---|
| 1 | (a) 3-ethyl-5-(1-ethyl-4(1H)-pyridylidene)-rhodanine (.065) | 100 | 1.5 | .05 | 58 |
|  | (b) 3,3'-diethyl-9-methyl-8,10-(o-phenylene)-thiacarbocyanine iodide (.08) | 186 | 2.5 | .05 | 58 |
|  | (c) dye (a) (.065) plus dye (b) (.08) | 400 | 2.2 | .05 | 58 |
| 2 | (d) dye (a) (.065) | 100 | 1.3 | .06 | 58 |
|  | (e) 3,3'-dimethyl-8,10-trimethyleneoxacarbocyanine iodide (.08) | 224 | 1.9 | .06 | 58 |
|  | (f) dye (a) (.065) plus dye (e) (.08) | 600 | 1.9 | .06 | 58 |
| 3 | (g) 8,10-ethylene-3,3'-dimethyloxacarbocyanine bromide (.08) | ca 60 |  | .06 | 58 |
|  | (h) dye (a) (.065) plus dye (g) (.08) | 210 | 1.9 | .06 | 58 |
| 4 | (i) 9-ethyl-3,3'-dimethyl-8,10-(o-phenylene)-thiacarbocyanine iodide (.08) | 330 | 2.2 | .06 | 58 |
|  | (j) dye (a) (.065) plus dye (i) (.08) | 550 | 1.8 | .06 | 58 |
| 5 | (k) 3,3'-dimethyl-9-phenyl-8,10-(o-phenylene)thiacarbocyanine iodide (.08) | 380 | 2.2 | .06 | 58 |
|  | (l) dye (a) (.065) (.08) plus dye (k) (.08) | 480 | 1.8 | .06 | 58 |
| 6 | (m) 3,3',9-triethyl-8,10-(o-phenylene)thiacarbocyanine iodide (.08) | 210 | 2.2 | .06 | 58 |
|  | (n) dye (a) (.065) plus dye (m) (.08) | 380 | 1.7 | .06 | 58 |
| 7 | (o) 3,3'-diethyl-8,10-(o-phenylene)thiacarbocyanine iodide (.08) | 130 | 1.4 | .06 | 58 |
|  | (p) dye (a) (.065) plus dye (o) (.08) | 660 | 1.7 | .06 | 58 |
| 8 | (q) 3,3'-diethyl-8,10-ethyleneoxacarbocyanine iodide (.08) | 190 | 2.7 | .08 | 58 |
|  | (r) dye (a) (.065) plus dye (q) (.08) | 340 | 1.8 | .06 | 58 |
| 9 | (s) dye (a) (.065) | nil |  |  | 25 |
|  | (t) 3,3'-diethyl-8,10-ethylenethiacarbocyanine iodide (.08) | 100 | 1.3 | .06 | 25 |
|  | (u) dye (a) (.065) plus dye (t) (.08) | 130 | 1.4 | .06 | 25 |
| 10 | (v) dye (a) (.065) | nil |  |  | 25 |
|  | (w) 1,1'-dimethyl-9,11-(o-phenylene)-2,2'-carbocyanine iodide (.08) | ca 25 |  | .06 | 25 |
|  | (x) dye (a) (.065) plus dye (w) (.08) | 100 | 1.6 | .06 | 25 |
| 11 | (y) dye (a) (.065) | 100 | 1.5 | .05 | 58 |
|  | (z) 3,3'-dimethyl-8,10-(o-phenylene)thiacarbo-cyanine iodide (.08) | <80 |  | .05 | 58 |
|  | (a') dye (a) (.065) plus dye (z) (.08) | 430 | 2.4 | .05 | 58 |
| 12 | (b') 3-ethyl-5-[1-(4-sulfobutyl)-4(1H)-pyridylidene]-rhodanine sodium salt (.065) | 106 | 1.6 | .05 | 58 |
|  | (c') dye (z) (.08) plus dye (b') (.065) | 420 | 2.3 | .06 | 58 |
| 13 | (d') 5-(1-ethyl-4(1H)-pyridylidene)rhodanine (.065)(rhodanine) (.065) | 85 | 1.3 | .05 | 58 |
|  | (e') dye (d') (.065) plus dye (z) (.080) | 320 | 2.3 | .05 | 58 |
| 14 | (f') 3,3'-dimethyl-8,10-(o-phenylene)oxacarbocyanine p-toluenesulfonate (.08) | 100 | 0.9 | .05 | 58 |
|  | (g') dye (a) (.065) | 105 | 1.5 | .05 | 58 |
|  | (h') dye (a) (.065) plus dye (f') (.08) | 170 | 2.5 | .05 | 58 |
| 15 | (i') 3-ethyl-5-(1-ethyl-2(1H)pyridylidene)-rhodanine (.065) | 115 | 2.5 | .05 | 58 |
|  | (j') dye (i') (.065) plus dye (f') (.080) | 200 | 2.5 | .05 | 58 |
| 16 | (k') 3-ethyl-5-(1-hydroxyethyl)-4(1H)pyridylidene)-rhodanine (.065) | 100 | 3.0 | .05 | 58 |
|  | (l') dye (k') (.065) plus dye (f') (.08) | 210 | 3.1 | .05 | 58 |
| 17 | (m') 3-ethyl-5-(1-ethoxycarbonylmethyl-4(1H)-pyridylidene)-rhodanine (.065) | 150 | 3.0 | .06 | 58 |
|  | (n') dye (m') (.065) plus dye (f') (.08) | 215 | 2.6 | .05 | 58 |
| 18 | (o') 3-ethyl-5-(1-β-phenoxyethyl-4(1H)-pyridylidene)rhodanine (.065) | ca 50 |  | .05 | 58 |
|  | (p') dye (z) (.08) | 110 | 0.9 | .05 | 58 |
|  | (q') dye (o') (.065) plus dye (z) (.08) | 280 | 2.3 | .06 | 58 |
| 19 | (r') 5-(1-benzyl-4(1H)-pyridylidene)-3-ethyl-rhodanine (.065) | 110 | 2.5 | .05 | 58 |
|  | (s') dye (r') (.065) plus dye (z) (.08) | 400 | 2.5 | .05 | 58 |
| 20 | (t') 3-ethyl-5-(1-phenacyl-4(1H)-pyridylidene)-rhodanine (.065) | 89 | 1.4 | .04 | 58 |
|  | (u') dye (t') (.065) plus dye (z) (.08) | 480 | 2.3 | .06 | 58 |
| 21 | (v') 2-dicyanomethylene-3-ethyl-5-(1-ethyl-4(1H)-pyridylidene)-4-thiazolidinone- (.065). | ca 25 |  | .05 | 58 |
|  | (w') dye (v') (.065) plus dye (z) (.08) | 185 | 2.4 | .06 | 58 |
| 22 | (x') 3-ethyl-5-(4(1H)-pyridylidene)rhodanine (.065) | ca 40 |  | .07 | 58 |
|  | (y') dye (x') (.065) plus dye (z) (.08) | 250 | 2.8 | .06 | 58 |
| 23 | (z') dye (a) (.1) | 100 | 4.4 | .06 | 58 |
|  | (a'') dye (f') (.16) | 107 | 3.0 | .06 | 58 |
|  | (b'') dye (a) (.1) plus dye (f') (.16) | 324 | 3.2 | .06 | 58 |
| 24 | (c'') 3,3'-dimethyl-8,10-(o-phenylene)-4,5,4',5'-dibenzooxacarbocyanine p-toluenesulfonate (.16) | 525 | 2.9 | .06 | 58 |
|  | (d'') dye (a) (.1) plus dye (c'') (.16) | 740 | 3.1 | .06 | 58 |
| 25 | (e'') dye (a) (.065) | 2 | 1.5 | .06 | 12 |
|  | (f'') dye (w) (.05) | ca 17 |  | .07 | 12 |
|  | (g'') dye (a) (.065) plus dye (w) (.05) | 53 | 2.3 | .06 | 12 |
| 26 | (h'') 4-(1-ethyl-4(1H)-pyridylidene)-3-methyl-2-thio-2,5-thiozolidinedione (.065) | <2 |  | .06 | 12 |
|  | (i'') dye (h'') (.03) plus dye (w) (.05) | 23 | 2.3 | .06 | 12 |
| 27 | (j'') 2-diphenylamino-5-(1-ethyl-4(1H)-pyridylidene)-4(5H)-thiazolinone (.065) | nil |  | .04 | 12 |
|  | (k'') dye (j'') (.03) plus dye (w) (.05) | 47 | 2.4 | .08 | 12 |
| 28 | (l'') 3-ethyl-5-(1-ethyl-4(1H)pyridylidene)-1-phenyl-2-thiohydantoin (.065) | nil |  | .06 | 12 |
|  | (m'') dye (l'') (.03) plus dye (w) (.05) | 56 | 2.3 | .06 | 12 |
| 29 | (n'') 3,3'-diethyl-8,10-ethylene-4,5,4',5'-di-benzothiacarbocyanine p-toluenesulfonate (.08) | 11 | 2.4 | .06 | 12 |
|  | (o'') dye (a) (.065) plus dye (n'') (.08) | 15 | 2.7 | .06 | 12 |
| 30 | (p'') 3,3'-dimethyl-8,10-(o-phenylene)-4,5,4',5'-dibenzothiacarbocyanine p-toluene-sulfonate (.08) | 74 | 3.0 | .07 | 12 |
|  | (q'') dye (a) (.065) plus dye (p'') (.08) | 85 | 3.0 | .08 | 12 |
| 31 | (r'') dye (a) (.065) | 100 | 1.3 | .06 | 12 |
|  | (s'') 3,3'-dimethyl-8,9-trimethylenethiacarbo-cyanine iodide (.08) | 174 | 1.5 | .06 | 12 |
|  | (t'') dye (a) (.065) plus dye (s'') (.08) | 190 | 1.6 | .06 | 12 |

The above examples are intended to be merely illustrative and it is to be understood that other simple merocyanine and carbocyanine dyes embraced by the above general formulas can be employed to advantage. It has also been found that dyes related to those of Formula II, except that the bridge of atoms is attached to two adjacent carbon atoms, can sometimes be used to advantage. Such a dye is illustrated in Example 31 of the table.

My invention is primarily directed to the ordinarily employed gelatino-silver-halide developing-out emulsions, e.g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in Knott et al. U.S. Patent 2,456,956, dated December 21, 1948, can also be employed in practicing my invention.

Photographic silver halide emulsions, such as those listed above, containing the supersensitizing combinations of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see Baldsiefen U.S. Patent 2,540,085, issued February 6, 1951; Damschroder U.S. Patent 2,597,856, issued May 27, 1952, and Yutzy et al. U.S. Patent 2,597,915, issued May 27, 1952), various palladium compounds, such as palladium chloride (Baldsiefen U.S. Patent 2,540,086, issued February 6, 1951), potassium chloropalladate (Stauffer et al. U.S. Patent 2,598,079, issued May 27, 1952), etc., or mixtures of such sensitizers; antifoggants, such as ammonium chloroplatinate (Trivelli et al. U.S. Patent 2,566,245, issued August 28, 1951), ammonium chloroplatinite (Trivelli et al. U.S. Patent 2,566,263, issued August 28, 1951), benzotriazole, nitrobenzimidazole, 5-nitroindazole, benzidine, mercaptans, etc. (see Mees "The Theory of the Photographic Process," MacMillan Pub., 1942, page 460), or mixtures thereof; hardeners, such as formaldehyde (Miller U.S. Patent 1,763,533, issued June 10, 1930), chrome alum (1,763,533), glyoxal (Brunken U.S. Patent 1,870,354, issued August 9, 1932), d.bromacrolein (Block et al. British Patent 406,750, accepted March 8, 1934), etc.; color couplers, such as those described in Salminen et al. U.S. Patent 2,423,730, issued July 7, 1947, Spence and Carroll U.S. Patent 2,640,776, issued June 2, 1953, etc.; or mixtures of such addenda. Dispersing agents for color couplers, such as those set forth in Jelley et al. U.S. Patent 2,322,027, issued June 15, 1943, and Mannes et al. U.S. Patent 2,304,940, issued December 15, 1942, can also be employed in the above-described emulsions.

The accompanying drawing illustrates schematically the supersensitizing effect obtained with three of my new combinations of dyes in gelatino-silver-bromiodide emulsions. Each figure in the drawing is a diagrammatic reproduction of three spectrograms. In each figure, the sensitivity of the emulsion containing only the carbocyanine dye of Formula II (or Formula IIa, or IIb) is represented by the solid curve, while the sensitivity of the same emulsion containing both the simple merocyanine dye of Formula I and the carbocyanine dye of Formula II (or IIa or IIb) is represented by the curve consisting of dotted lines. No curve depicting the sensitivity of the simple merocyanine dye of Formula I alone is provided, since it was found that in the emulsions tested this dye had insufficient sensitizing action to be shown on such a diagrammatic scale. In Figure 1, curve A represents the sensitivity of an ordinary gelatino-silver-bromiodide emulsion sensitized with 3,3'-diethyl-9-methyl-8,10-(o-phenylene)thiacarbocyanine iodide, while curve B represents the sensitivity of the same emulsion sensitized both with 3,3'-diethyl-9-methyl-8,10-(o-phenylene)thiacarbocyanine iodide and 3-ethyl-5-(1-ethyl-4(1H)pyridylidene)rhodanine. The sensitometric measurements for these emulsions are given in Example 1 of the above table.

In Figure 2, curve C represents the sensitivity of an ordinary gelatino-silver-bromiodide emulsion sensitized with 3,3'-dimethyl-8,10-trimethyleneoxacarbocyanine iodide, while curve D represents the sensitivity of the same emulsion sensitized both with 3,3'-dimethyl-8,10-trimethyleneoxacarbocyanine iodide and 3-ethyl-5-(1-ethyl-4-(1H)-pyridylidene)rhodanine. The sensitometric measurements for these emulsions are given in Example 2 of the above table.

In Figure 3, curve E represents the sensitivity of an ordinary gelatino-silver-bromiodide emulsion sensitized with 3,3'-dimethyl-8,10-(o-phenylene)thiacarbocyanine iodide, while curve F represents the sensitivity of the same emulsion sensitized both with 3,3'-dimethyl-8,10-(o-phenylene)thiacarbocyanine iodide and 3-ethyl-5-(1-phenacyl-4(1H)-pyridylidene)rhodanine. The sensitometric measurements for these emulsions are given in Example 20 of the above table.

As indicated above, the carbocyanine dyes of my invention represented by Formula II (or IIa or IIb) can be prepared according to methods which have been previously described in the prior art. However, the following examples will serve to illustrate the method whereby several of these dyes can be prepared.

*Example A.—3,3'-diethyl-9-methyl-8,10-o-phenylenethiacarbocyanine iodide*

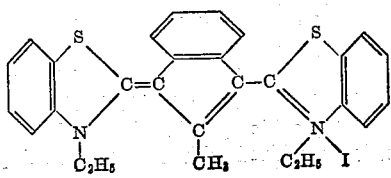

A mixture of 1.37 g. of α,α'-di(2-benzothiazolyl ethiodide)-o-xylene, 0.7 g. of triethyl orthoacetate, 10 ml. of acetic anhydride and 0.38 g. of triethylamine was heated at the refluxing temperature for 15 minutes. After chilling, the solid was collected on a filter and washed with acetone. The yield of dye was 60% crude and 36% after two recrystallizations from ethanol. The brown crystals with a greenish reflex melted at 179–180° C. with decomposition.

The α,α'-di(2-benzothiazolyl ethiodide)-o-xylene was prepared by heating a mixture of 4.3 g. of α,α'-di(2-benzothiazolyl)-o-xylene and 5.1 g. of ethyl p-toluenesulfonate at 80° C. for about 54 hours. The crude quaternary salt was washed with diethyl ether, the residue was dissolved in hot ethanol and the solution was treated with a hot aqueous solution of sodium iodide. After cooling, the quaternary salt was collected on a funnel and then recrystallized from water.

The α,α'-di(2-benzothiazolyl)-o-xylene was prepared by heating a mixture of 37.5 g. of o-aminothiophenol, 15.6 g. of o-phenylenediacetonitrile and 100 ml. of diphenyl ether at the refluxing temperature for 105 minutes. During the heating period a stream of dry nitrogen was bubbled through the reaction mixture. After chilling in an ice-water bath the mixture was treated with diethyl ether, the solid was collected on a filter and washed with diethyl ether. The yield of base was 70% crude and 53% after one recrystallization from ligroin (B.P. 66–75° C.). The yellow needles melted at 90–91° C.

*Example B.—8,10-ethylene-3,3'-dimethyloxacarbocyanine bromide*

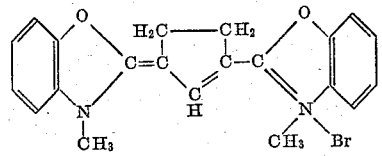

A mixture of 6.65 g. of crude 1,4-di(2-benzoxazolyl metho-p-toluenesulfonate)butane, 3.24 g. of diethoxymethylacetate, 35 ml. of dry pyridine and 2.02 g. of triethylamine was heated at the refluxing temperature for 15 minutes. After chilling the reaction mixture, it was stirred with diethyl ether and a little water. The solid was collected on a filter, then it was dissolved in hot ethanol and the solution was treated with hot aqueous bromide. After chilling, the solid was collected on a filter. The yield of dye was 44% crude and 17% after two recrystallizations from ethanol. The dark crystals melted at 277–278° C. with decomposition.

The 1,4-di(2-benzoxazolyl metho p-toluenesulfonate)butane was prepared by heating a mixture of 2.92 g. of 1,4-di(2-benzoxazolyl)butane with 4.1 g. (10% excess) of methyl-p-toluenesulfonate at the temperature of the steam bath for 48 hours. This quaternary salt was used crude.

The 1,4-di(2-benzoxayzl)butane was prepared by heating a mixture of 31.8 g. of o-aminophenol, 10.8 g. of adiponitrile, 60 ml. of diphenyl ether and 16.6 ml. of concentrated hydrochloric acid at the refluxing temperature for 2 hours. During the heating period a stream of dry nitrogen was bubbled through the reaction mixture. The hot reaction mixture was poured into ice-water, the mixture was made weakly basic with dilute sodium hydroxide and the whole was extracted with diethyl ether. The ether extract was washed first with dilute sodium hydroxide and then with water. The dihydrochloride of the base was formed by treating the ether solution with dilute hydrochloric acid. The aqueous layer was separated, it was made slightly alkaline with dilute aqueous sodium hydroxide and then the 1,4-di(2-benzoxazolyl)butane was collected on a filter. The yield of product was 20 g. of crude and 7 g. after one recrystallization from methanol. The buff crystals melted at 135–136° C. with decomposition.

*Example C.—3,3' - dimethyl - 9 - phenyl - 8,10 - o - phenylenethiacarbocyanine iodide*

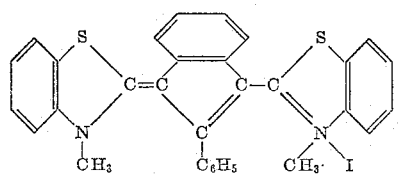

A mixture of 1.1 g. of α,α'-di(2-benzothiazolyl methiodide)-o-xylene, 20 ml. of dry pyridine and 0.27 g. of benzoyl chloride was allowed to stand at room temperature for one hour, then 0.39 g. of triethylamine was added and the whole was heated at the refluxing temperature for 2 minutes. The reaction mixture was allowed to stand at room temperature for five minutes and then filtered. The pyridine filtrate was treated with diethyl ether, then the solid was collected on a filter and washed first with warm water and then acetone. The yield of dye was 58% crude and 30% after two recrystallizations from methanol. The orange-scarlet crystals melted at 303–304° C. with decomposition.

*Example D.—1,1' dimethyl - 9,11 - o - phenylene - 2,2'-carbocyanine iodide*

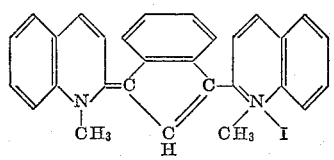

A mixture of 7.58 g. of 1-methyl-2-phenylmercaptoquinolinium iodide, 2.32 g. of indene, 25 ml. of dry pyridine and 2.02 g. of triethylamine was heated at the refluxing temperature for 30 minutes. After chilling, the solid was collected on a filter and washed first with acetone, then water and finally more acetone. The dye (1.73 g.) was dissolved in hot cresol, the solution was filtered and methanol was added to the hot filtrate. After chilling, the dye was collected on a filter and washed with methanol. The greenish crystals (1.60 g.) melted at 294–295° C. with decomposition.

*Example E.—3,3' - dimethyl - 8,9 - trimethylenethiacarbocyanine iodide*

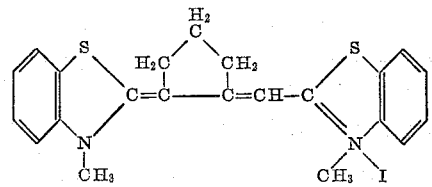

A mixture of the crude 3-methyl-2(1-methyl-1-cyclopenten-2-yl)benzothiazolium bromide, 3.67 g. (1. mol.) of 3 - methyl - 2 - methylmercaptobenzothiazolium p-toluenesulfonate, 25 ml. of absolute ethyl alcohol and 1.21 g. (1 mol. plus 20% excess) of triethylamine was heated at the fluxing temperature for 40 minutes. The hot reaction mixture was treated with an excess of hot aqueous potassium iodide. After chilling, the dye-iodide was collected on a filter and washed with water. The dye was transferred to a beaker and stirred with hot acetone. After chilling, the dye was collected on a filter and washed with acetone. The yield of dye was 0.66 g. crude and 0.30 g. after four recrystallizations from methyl alcohol. The green crystals, with reddish reflex, melted at 238–239° C. with decomposition.

The identical dye was obtained, in like manner, from the second specimen of 3-methyl-2-(1-methyl-1-cyclopenten-2-yl)-benzothiazolium bromide.

The 3 - methyl - 2 - (1 - methyl - 1 - cyclopenten - 2 - yl) benzothiazolium bromide used in the above example was prepared as follows:

A solution of 3.26 g. (1 mol.) of 1-(1-cyano-1-ethoxycarbonylmethylene) - 2 - (3 - methyl - 2(3H) - benzothiazolylidene)-cyclopentane (Kendall, Suggate and Mayo British Patent 704,840), in a mixture of 9 ml. of 30% hydrobromic acid in acetic acid and 1 ml. of water was heated at the refluxing temperature for 30 minutes. The resulting solution was concentrated to dryness and the remaining residue was dried in a vacuum desiccator over potassium hydroxide. This quaternary salt was used for dye formation without further purification.

A second specimen of 3-methyl-2-(1-methyl-2-cyclopenten-2-yl)benzothiazolium bromide was prepared by the hydrolysis of 1-dicyanomethylene-2-(3-methyl-2(3H)-benzothiazolylidene)cyclopentane.

The invention has been described in detail with particular reference to preferred embodiments thereof, but it will be understood that variations and modifications can be effected within the spirit and scope of the invention as described hereinabove and as defined in the appended claims.

What I claim as my invention and desire secured by Letters Patent of the United States is:

1. A photographic silver halide developing-out emulsion sensitized with a supersensitizing combination of (1) a simple merocyanine dye selected from the class represented by the following general formula:

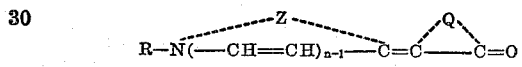

wherein R represents a member selected from the class consisting of a hydrogen atom and an alkyl group, $n$ represents a positive integer of from 1 to 2, Z represents the non-metallic atoms necessary to complete a pyridine nucleus, and Q represents the non-metallic atoms necessary to complete a heterocyclic nucleus selected from the class consisting of a pyrazolinone nucleus, an isoxazolinone nucleus, an oxindole nucleus, a rhodanine nucleus, a 2-selena-2,4-thiazolidine dione nucleus, a 2-thio-2,4-oxazolidinedione nucleus, a 2-thio-2,5-thiazolidinedione nucleus, a 2,4-thiazolidinedione nucleus, a thiazolidinone nucleus, a 4-thiazolinone nucleus, a 2(3H)-thiophenone nucleus, a 2-imino-2,4-oxazolinone nucleus, a 2,4-imidazolinedione nucleus, a 2-thio-2,4-imidazolinedione nucleus, and a 5-imidazolinone nucleus, and (2) a carbocyanine dye selected from the class represented by the following general formula:

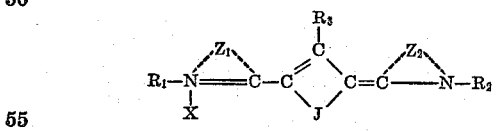

wherein $R_1$ and $R_2$ each represents an alkyl group, $R_3$ represents a member selected from the class consisting of a hydrogen atom, a lower alkyl group and a monocyclic aryl group, J represents a member selected from the class consisting of an alkylene group containing from 2 to 3 carbon atoms and an o-phenylene group, provided $R_3$ represents a hydrogen atom when J represents an alkylene group containing from 2 to 3 carbon atoms, X represents an acid radical, and Z and $Z_1$ each represents the non-metallic atoms necessary to complete a heterocyclic nucleus selected from the class consisting of a benzothiazole nucleus, a naphthothiazole nucleus, a benzoxazole nucleus, a naphthoxazole nucleus, a benzoselenazole nucleus, a naphthoselenazole nucleus, and a 2-quinoline nucleus.

2. A photographic silver halide emulsion as defined in claim 1 wherein the silver halide is silver bromiodide.

3. A photographic gelatino-silver-halide developing-out emulsion sensitized with a supersensitizing combination of (1) a simple merocyanine dye selected from the class represented by the following general formula:

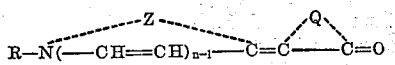

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

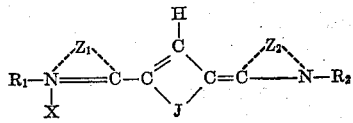

wherein $R_1$ and $R_2$ each represents an alkyl group, J represents an alkylene group containing from 2 to 3 carbon atoms, X represents an acid radical and $Z_1$ and $Z_2$ each represents the non-metallic atoms necessary to complete a heterocyclic nucleus selected from the class consisting of a benzothiazole nucleus, a naphthothiazole nucleus, a benzoxazole nucleus, a naphthoxazole nucleus, a benzoselenazole nucleus, a naphthoselenazole nucleus and a 2-quinoline nucleus.

4. A photographic gelatino-silver-halide developing-out emulsion sensitized with a supersensitizing combination of (1) a simple merocyanine dye selected from the class represented by the following general formula:

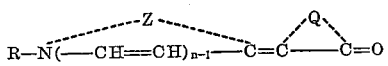

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

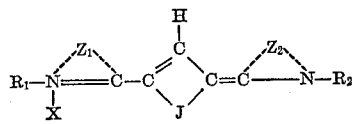

wherein $R_1$ and $R_2$ each represents an alkyl group, J represents an alkylene group containing from 2 to 3 carbon atoms, X represents an acid radical and $Z_1$ and $Z_2$ each represents the non-metallic atoms necessary to complete a benzoxazole nucleus.

5. A photographic silver halide developing-out emulsion sensitized with a supersensitizing combination of 3-ethyl - 5 - (1-ethyl-4(1H)-pyridylidene)rhodanine and 3,3'-dimethyl-8,10 - trimethyleneoxacarbocyanine iodide.

6. A photographic gelatino-silver-halide developing-out emulsion sensitized with a supersensitizing combination of (1) a simple merocyanine dye selected from the class represented by the following general formula:

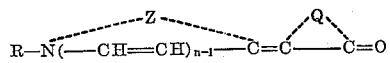

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

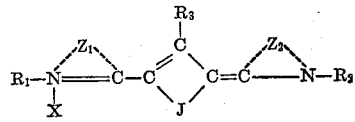

wherein $R_1$ and $R_2$ each represents an alkyl group, $R_3$ represents a lower alkyl group, J represents an o-phenylene group, X represents an acid radical and $Z_1$ and $Z_2$ each represents the non-metallic atoms necessary to complete a heterocyclic nucleus selected from the class consisting of a benzothiazole nucleus, a naphthothiazole nucleus, a benzoxazole nucleus, a naphthoxazole nucleus, a benzoselenazole nucleus, a naphthoselenazole nucleus and a 2-quinoline nucleus.

7. A photographic gelatino-silver-halide developing-out emulsion sensitized with a supersensitizing combination of (1) a simple merocyanine dye selected from the class represented by the following general formula:

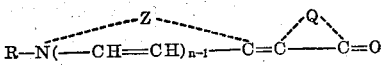

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

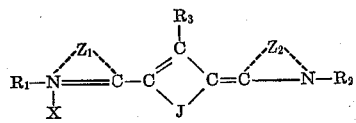

wherein $R_1$ and $R_2$ each represents an alkyl group, $R_3$ represents a lower alkyl group, J represents an o-phenylene group, X represents an acid radical and $Z_1$ and $Z_2$ each represents the non-metallic atoms necessary to complete a benzothiazole nucleus.

8. A photographic silver halide developing-out emulsion sensitized with a supersensitizing combination of 3-ethyl - 5 - (1-ethyl-4(1H)-pyridylidene)rhodanine and 9-ethyl-3,3' - dimethyl - 8,10-o-phenylenethiacarbocyanine iodide.

9. A photographic gelatino-silver-halide developing-out emulsion sensitized with a supersensitizing combination of (1) a simple merocyanine dye selected from the class represented by the following general formula:

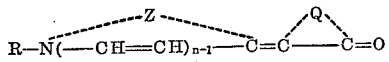

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

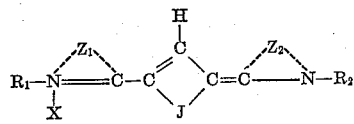

wherein $R_1$ and $R_2$ each represents an alkyl group, J represents an o-phenylene group, X represents an acid radical and $Z_1$ and $Z_2$ each represents the non-metallic atoms necessary to complete a heterocyclic nucleus selected from the class consisting of a benzothiazole nucleus, a naphthothiazole nucleus, a benzoxazole nucleus, a naphthoxazole nucleus, a benzoselenazole nucleus, a naphthoselenazole nucleus and a 2-quinoline nucleus.

10. A photographic gelatino-silver-halide developing-out emulsion sensitized with a supersensitizing combination of (1) a simple merocyanine dye selected from the class represented by the following general formula:

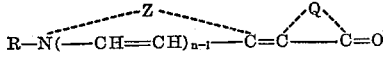

wherein R represents a member selected from the class consisting of a hydrogen atom and an alkyl group, Z represents the non-metallic atoms necessary to complete a pyridine nucleus and Q represents the non-metallic atoms necessary to complete a rhodanine nucleus, and (2) a carbocyanine dye selected from the class represented by the following general formula:

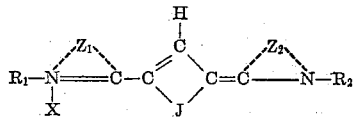

wherein $R_1$ and $R_2$ each represents an alkyl group, J represents an o-phenylene group, X represents an acid radical and $Z_1$ and $Z_2$ each represents the non-metallic atoms necessary to complete a benzothiazole nucleus.

11. A photographic silver halide developing-out emulsion sensitized with a supersensitizing combination of a 3 - ethyl - 5 - (1-ethyl-4(1H)-pyridylidene)rhodanine and 3,3'-diethyl-8,10 - (o-phenylene)thiacarbocyanine iodide.

12. A photographic silver halide developing-out emulsion sensitized with a supersensitizing combination of 3-ethyl - 5 - [1-(4-sulfobutyl)-4(1H)-pyridylidene]rhodanine sodium salt and 3,3'-dimethyl-8,10-(o-phenylene) thiacarbocyanine iodide.

13. A photographic silver halide developing-out emulsion sensitized with a supersensitizing combination of 3-ethyl - 5 - (1 - phenacyl-4(1H)-pyridylidene)rhodanine and 3,3'-dimethyl - 8,10-(o-phenylene)thiacarbocyanine iodide.

14. A photographic silver halide developing-out emulsion sensitized with a supersensitizing combination of 2-dicyanomethylene - 3 - ethyl-5-(1-ethyl-4(1H)-pyridylidene)-4-thiazolidone and 3,3'-dimethyl-8,10-(o-phenylene)thiacarbocyanine iodide.

No references cited.